United States Patent [19]

Lopez et al.

[11] Patent Number: 5,079,824
[45] Date of Patent: Jan. 14, 1992

[54] METHOD FOR THE INSTALLATION OF A JACKET REINFORCEMENT FOR PIPING

[76] Inventors: Jesus S. Lopez, Reforma Lomas No. 615, Col. Lomas de Chapultepec, 05000, D. F. Mexico; Arturo C. Yamin, Pensilvania no. 26, Int. 201, Col. Napoles, 03810, D. F. Mexico, both of Mexico

[21] Appl. No.: 401,776

[22] Filed: Sep. 1, 1989

[30] Foreign Application Priority Data

Sep. 2, 1988 [MX] Mexico ..................................... 12918

[51] Int. Cl.$^5$ .......................... B23P 6/04; F16L 55/18
[52] U.S. Cl. ............................. 29/402.13; 29/402.16; 29/402.18; 29/455.1; 29/469; 138/98; 228/119; 285/15
[58] Field of Search ............ 29/401.1, 402.01, 402.09, 29/402.13, 402.16, 402.18, 455.1, 460, 463, 469, 469.5, 421.1, 514, 516, 527.3; 228/119, 126, 182; 56/304.2; 38/97, 98, 99; 285/47, 97, 138, 294, 904

[56] References Cited

U.S. PATENT DOCUMENTS

| | | | |
|---|---|---|---|
| 2,850,045 | 9/1958 | Soehnlen et al. | 138/99 |
| 3,826,521 | 7/1974 | Wilhelmsen | 138/97 X |
| 4,602,659 | 7/1986 | Parkyn, Sr. | 138/98 |
| 4,780,163 | 10/1988 | Haneline, Jr. et al. | 138/98 X |

*Primary Examiner*—Joseph M. Gorski
*Assistant Examiner*—Peter Dungba Vo
*Attorney, Agent, or Firm*—Leydig, Voit & Mayer

[57] ABSTRACT

A jacket for reinforcement of piping, and especially petroleum piping, including a jacket, joint elements between the jacket and the conducting piping, resin disposed in the space between the piping and the jacket, injection fittings or couplings for injection of the resin, and welds connecting the main body of the jacket and the joint elements.

15 Claims, 9 Drawing Sheets

METHOD FOR THE INSTALLATION OF A JACKET REINFORCEMENT FOR PIPING

The invention lies in the field of reinforcements for conduction piping which have suffered a thinning or decrease in the thickness of the walls resulting from corrosion caused by the atmosphere, erosion and mechanical means or which have suffered mechanical damage caused by one of these factors.

Said conduction piping are employed in the petrol and petrochemical industries principally, where there is the necessity of affecting repairs such as the following:

A) Change of the piping section for replacement of the damaged zone.

B) Provision of a metal jacket with the aim of reinforcing said piping.

As is evident, the necessity of affecting the repairs mentioned above, for example the replacement of the damaged zone, may involve leaving the piping or duct out of service which represents serious economic damages. Thus the completion of said repairs without effecting the functioning of the pipeline constitutes the primary object of the invention by which significant advantages may be obtained.

Nonetheless, the majority of users consider the provision of jackets only one type of provisional repair due to the disadvantage that it is difficult to comply with the very strict standards for the preparation of materials and weld applications.

In effect the procedures for welding piping in operation are procedures which require very strict quality control, in the assembly and welding of the jacket and the jacket joints and the piping therewithin, all due to the evident risk implied by welding over pressurized piping.

The necessity of affecting repairs has necessitated the ample study of this process and its variables both from the theoretical point of view as well as the practical. To obtain safe and reliable results in the majority of cases, it is required that the standards be complied with strictly.

Finally, during the process of applying welds on pressurized piping, it is necessary to reduce the normal operating pressure of the piping with regard to these considerations.

It is known in the art by experts in the field, of the repair of conduction piping or ducts by means of providing a metal jacket, as a sleeve for the piping, which acts as a mechanical structural reinforcement for the damaged section, requiring that the sleeve must be in direct contact with the entire body of the piping.

Said repairs of the jacket type are completed by employing two sections of semicircular rolled plates which encase the piping and are welded to the same in two longitudinal welds (relative to the pipe axis) which join the two sections of the sleeve and the piping therewithin and two or more circumferential welds (relative to the pipe axis) which join the sleeve and the pipe therewithin.

The details of the welds and the processes involved, such as the type of bevel, dimensions and procedures for the application of welds, are found in the standards of the code of ASME Section IV, for the types of materials employed in the repair.

Such known types of jacket involve, to comply with the requirement of maintaining direct contact with the piping, that the interior diameter of the sleeve be equal to the exterior diameter of the piping to be repaired. This requirement raises the following limitations and inconveniences:

I.—In the vast majority of cases, upon repairing the piping, mechanical damage (deformation) or deterioration is introduced and depending on the magnitude of the damage the use of the mechanism is limited since it is now difficult to adjust the sleeve such that it stay totally and absolutely with the piping.

II.—Accordingly, to comply with the primary requirement of this type of jacket, to stay in direct contact with the piping, it is necessary to adjust the sleeve over the piping at the repair site in all cases without exception.

III.—Another disadvantage is that in the two sections of the sleeve, an excess of material must be left to be placed against the pipe to conform it if required, to dimension it and make the bevels for the weld joints.

IV.—Another additional disadvantage is that, since it is impossible, at the repair site, to rely on the shop equipment required to effect the repair by mechanical means as dictated by the standards to adjust the sleeve and make the bevels, this results in a lack in quality since the use of heat and oxyacetylene cutting torches are employed for adjustment and to make the bevels.

These are methods which are not recommended by the ASME and the ASW standards which dictate the preparation of materials and the application of welds.

V.—One evident disadvantage comes from the fact that the longitudinal and circumferential welds required for the installation always weld the sleeve to the piping requiring very strict quality control over the execution of the weld due to the risk involved by the piping being pressurized.

VI.—Similarly, one evident disadvantage lies in that the operating pressure of the piping must be reduced during the entire welding process in the installation of the jacket.

SUMMARY OF THE INVENTION

Given the above mentioned disadvantages a principal object of the invention is to provide a jacket assembly as a reinforcement for piping which overcomes said disadvantages and offers economic advantages.

Accordingly, the principal object of the invention is to provide a method for pipeline repairs (of the permanent type), either terrestrial or submerged under water, with large advantages over known repair methods mentioned above.

A preferred embodiment of the invention comprises a jacket assembly for piping of any diameter and thickness for the purpose of reinforcing a portion of the piping. This is accomplished by means of a set of curved jacket sections of carbonized or other type of steel (having the same or compatible specifications as the piping to be repaired) welded at longitudinally abutting edges, serving as a sleeve for the piping and providing an annular space between the piping and the jacket assembly wherein, after the installation and welding of the jacket sections to the piping, a resin is injected, the resin being of a polymer, copolymer, or other type of base and having the mechanical properties required given the operating pressure and particular piping characteristics, such that the jacket assembly is integrated with the piping forming a single structure comprised of the piping, the resin and the jacket sections; with this invention strength in the repaired section may be achieved which is greater even than the design strength of the original piping, in contrast with the prior art in which the jacket should be completely attached to the pipe with no separation between these parts.

A jacket assembly according to the invention is not limited for use only in the linear portions of piping, but may be used in piping portions having a change of geometry for example and in elbow joints having any radius and dimensions, in "T" and "Y" type piping joints, etc.

Accordingly, in a preferred form the invention comprises a jacket assembly for reinforcing piping of any diameter, thickness, or length, thereby restoring or even improving the original design specifications.

The sleeve or jacket sections may be formed of two or more semicircular sections depending on the length and location of the piping section to be repaired and also on the accessibility and the facility in assembly. Tapered end joint elements between the jacket sections and the piping are welded at the extremities of the jacket sections. The geometry of these tapered elements may vary depending on the conditions and characteristics of the piping to be repaired.

The jacket assembly utilizes couplings for the injection of the resin into the annular space, and these may be situated in any portion of the jacket assembly body depending on the particulars of each case since the conditions of the injection change depending if the piping is in a vertical, horizontal, or inclined position, or on the facility in access to the couplings.

In the annular space, a resin may be used having a polymer, copolymer, or any other type of base and having physical and mechanical properties specific for the type of repair and particular characteristics of the piping.

The resin is intended to serve as a means for integrating the piping and the jacket assembly as a single integrated structure, resulting in a composite section formed of the piping, the resin and the jacket assembly whereby a strength greater than the original design strength of the piping may be obtained with the structure thus formed. Additionally, the resin injected in the annular space may have a second fundamental function and may have different physical properties such as being an insulator, having high resistance to abrasion, etc., opening the important possibility of resolving or arresting the problem which originally caused the damage in the piping.

DESCRIPTION OF THE DRAWINGS

The invention will be described with reference to the attached drawings in which.

DETAILED DESCRIPTION OF THE INVENTION

Figure 1:
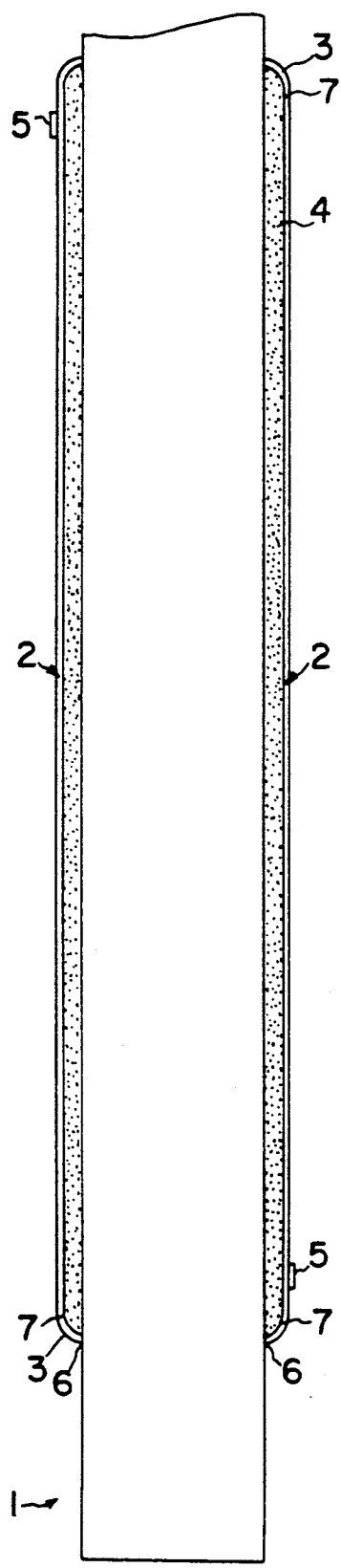
FIG. 1 is a schematic side view in longitudinal cross section of the piping, resin and the sleeve or jacket assembly.

The advantages of the invention over the methods of the prior art are evident as summarized in, but not limited to, the following:

I.—Allows permanent repairs in piping in linear sections and in sections having a change in geometry without having to remove the piping from operation, offering a tremendous economic advantage.

II.—The invention offers significant benefit in piping repair because the jacket assembly initially is not in contact with the piping to be repaired, which is not possible with the traditional jacketing method.

III.—With the invention, complete contact is possible between the damaged piping and the jacket assembly by means of the injected resin even when the piping has deformations or mechanical damages or deterioration in the external wall from corrosion or other causes.

IV.—With the present invention there is a radical reduction in the risk of welding directly on piping which is in operation since with this invention only two circumferential welds (relative to the axis of the piping) are required for the installation of the jacket assembly on the piping. The longitudinal and circumferential welds required to assemble the jacket assembly do not contact the piping.

V.—Thus the invention radically reduces the time for which the piping operating pressure must be dropped to effect the joint welds between the jacket assembly and the piping.

VI.—Also, invention allows reduction in installation time because it does not require the adjustment of the sleeve or jacket assembly over the piping.

VII.—The jacket assembly can be completely fabricated in a shop and mounted on a jig for transport and assembled in situ, whereat all the dimensions and weld bevels are adjusted allowing easy installation.

VIII.—With the invention, an improved quality in the fabrication of the jacket assembly can be achieved in the shop which allows strict adherence to ASME standards applicable in fabrication.

IX.—Additionally the invention allows the resin injected into the annular space between the piping and the jacket assembly, in addition to complying with the structural function in the combination, to comply with a second fundamental function by having physical properties such as: being an insulator, having high resistance to abrasion, etc.

With this many important possibilities are opened for the repair of any piping within the particular operating conditions, while arresting the problem which originated the failure.

Among those problems which may originate a failure may be the following, those listed not being limitation of the possible cases.

A.—Loss Of External Thickness. Piping will be repaired because of a decrease in the thickness of the wall suffered due to accelerated external corrosion from the high operating temperature of the duct.

In this particular case, the injected resin would have mechanical and insulative properties to allow the exterior wall of the section formed by the piping, resin and the sleeve to work at a much lower temperature thus radically reducing corrosion.

B.—Loss Of Internal Thickness. Piping will be repaired at an elbow joint because of a decrease in the thickness of the wall due to internal abrasion from solid particles contained in the fluid.

In this particular case, the resin would have mechanical and high abrasion resistant properties to allow that even when the interior wall of the elbow joint wears, the resin, with abrasion resistant properties superior to those of the piping, will begin to act as a protectant for the elbow sleeve thus achieving a greatly increased useful life span.

Referring now particularly to the drawings previously mentioned, the components comprising the improved jacket assembly of the present invention will be described in detail.

In FIG. 1 the conducting pipe 1 (the piping to be repaired) is illustrated in longitudinal cross section with the sleeve or jacket assembly 2 and the end joint element 3 between the jacket assembly and the conducting pipe 1. The geometry of the joint element 3 shown in this case is described in detail in FIGS. 9-14. Also shown is the resin 4 disposed in the space between the piping 1 and the jacket assembly 2, which is injected through the injection fittings or couplings 5.

Finally, it is noted that the number and position of these couplings is variable and they may be situated in any part of the jacket assembly. Also illustrated are the weld joints 6 between the end joint element 3 and the piping 1 and the weld 7 between the jacket assembly 2 and the end joint element 3.

Figure 2:
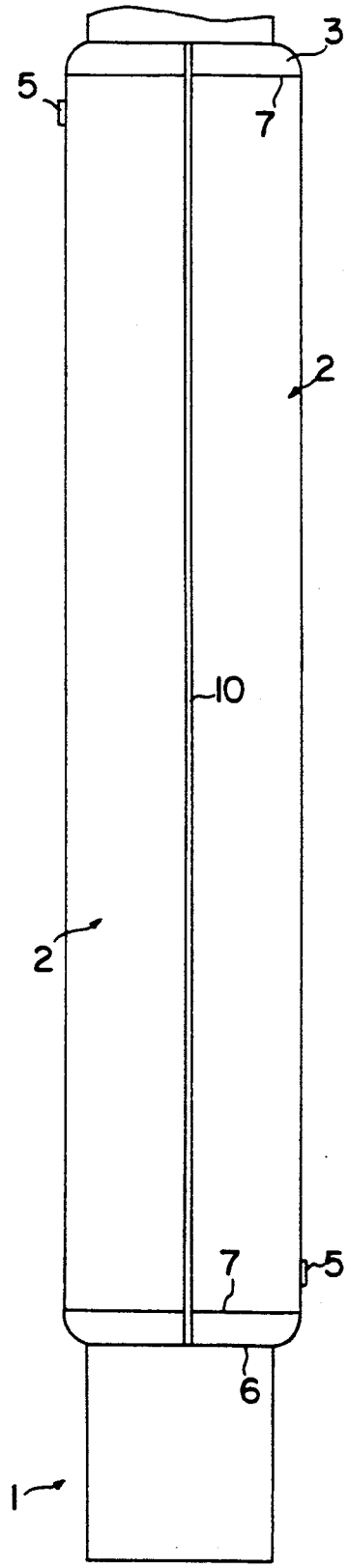
FIG. 2 is a side view of the jacket assembly and the section of piping.

FIG. 2, a longitudinal side view, shows the exterior appearance of the jacket assembly 2 and the piping 1 wherein the main body of the jacket assembly 2 can be seen to be two ½ pipes. Also shown in this figure is the joint element 3 between the jacket assembly 2 and the piping 1, the injection fitting or coupling 5 for the injection of resin 4, the weld joint 6 between the jacket assembly 2 and the piping 1 and the weld 7 between the jacket assembly main body and the joint element 3 and the additional longitudinal weld 10 joining the two jacket ½ pipes.

Figure 3:
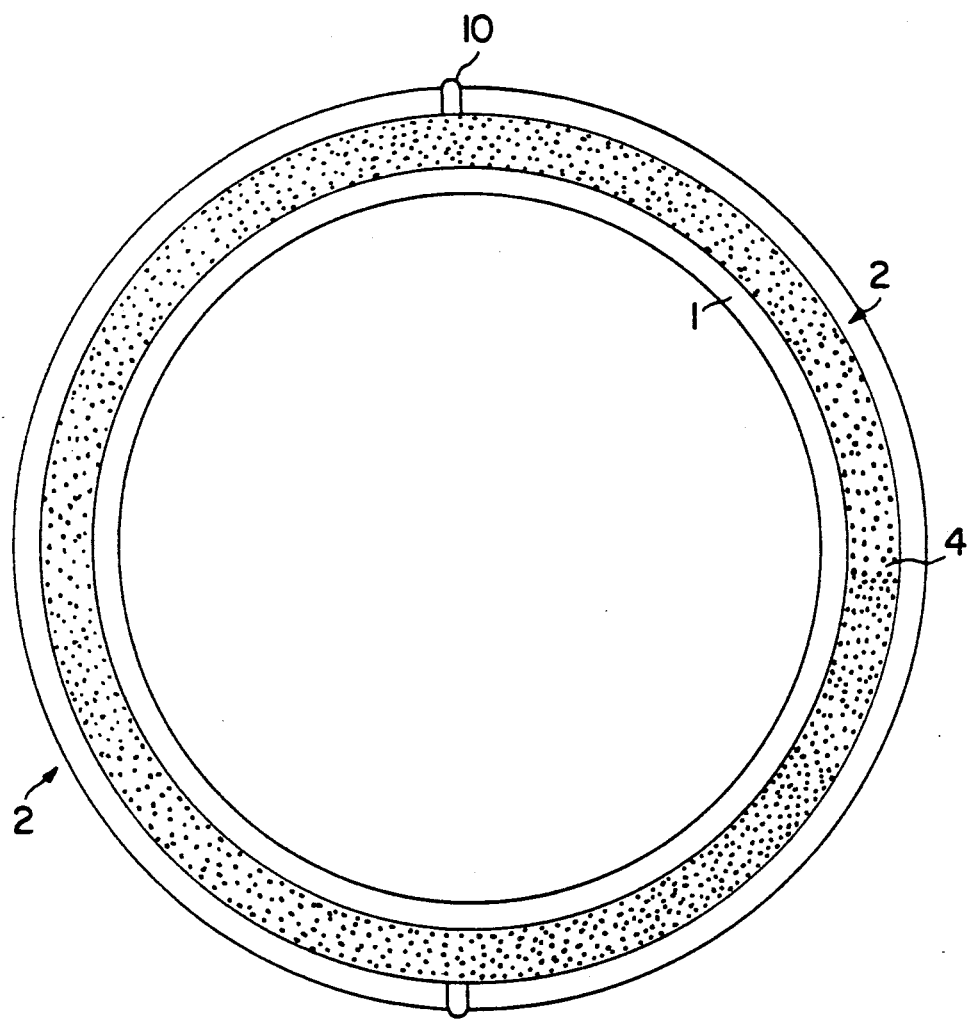
FIG. 3 is a plan view of a transverse cross section of the piping, resin and the sleeve or jacket assembly.

FIG. 3, a plan view of the transverse cross section of the middle section of the jacket assembly, clearly shows the three elements forming the combined section comprising the piping 1, the resin 4 disposed in the space between the jacket and the piping 1, and the main body of jacket assembly 2.

Figure 4:
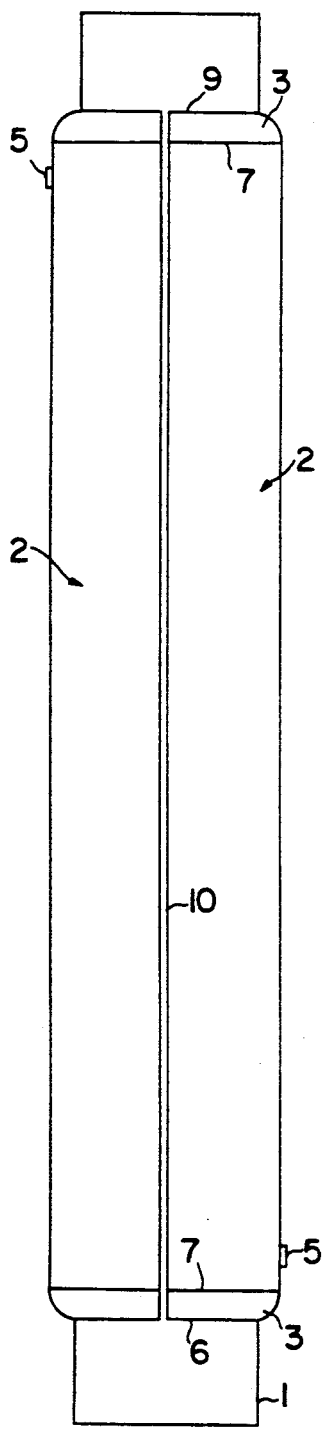
FIG. 4 is a side view of the jacket assembly of one section formed by two ½ pipes.

FIG. 4 shows a first embodiment of the invention, in a longitudinal side view, of how the jacket assembly may be formed of two or more semicircular ½ pipes enveloping the piping 1.

At the extremities in FIG. 4 the joint element 3 is welded between the jacket assembly 2 and the piping 1.

Figure 9:
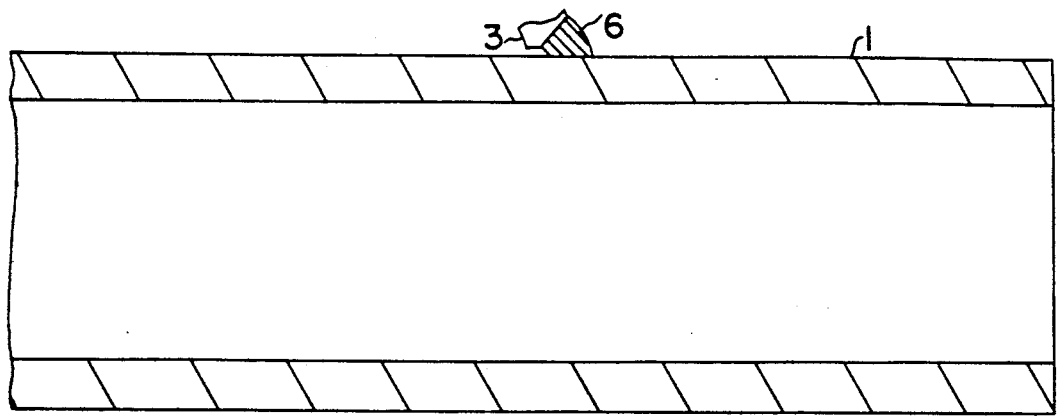
FIG. 9 is a side cross-sectional view of one type of a ½ tapered end joint element, the other ½ element being omitted for simplification.
Figure 10:
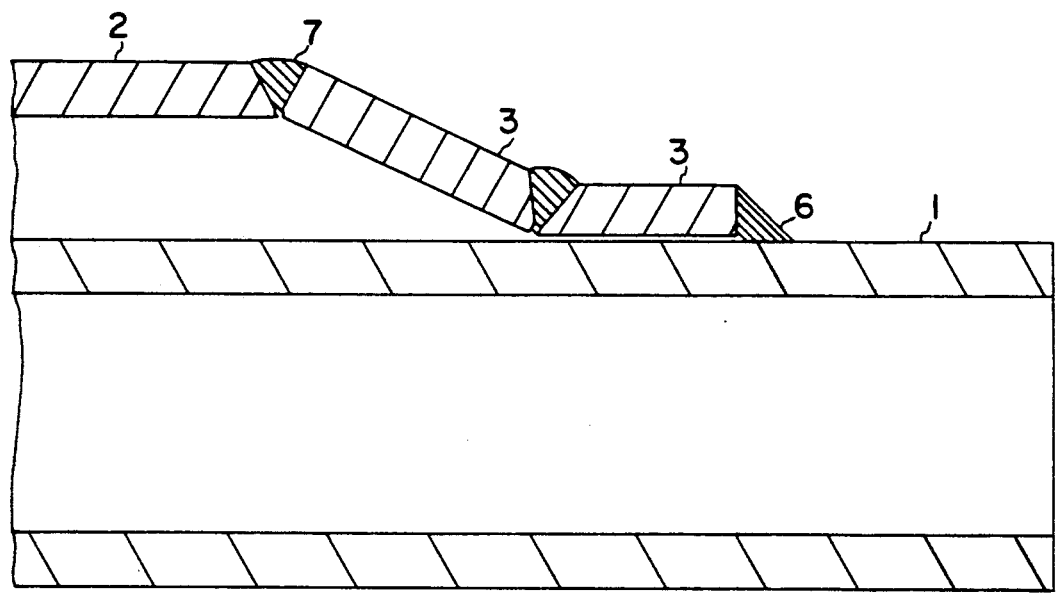
FIG. 10 is a side cross-sectional view similar to FIG. 9 of another type of ½ tapered end joint element.
Figure 11:
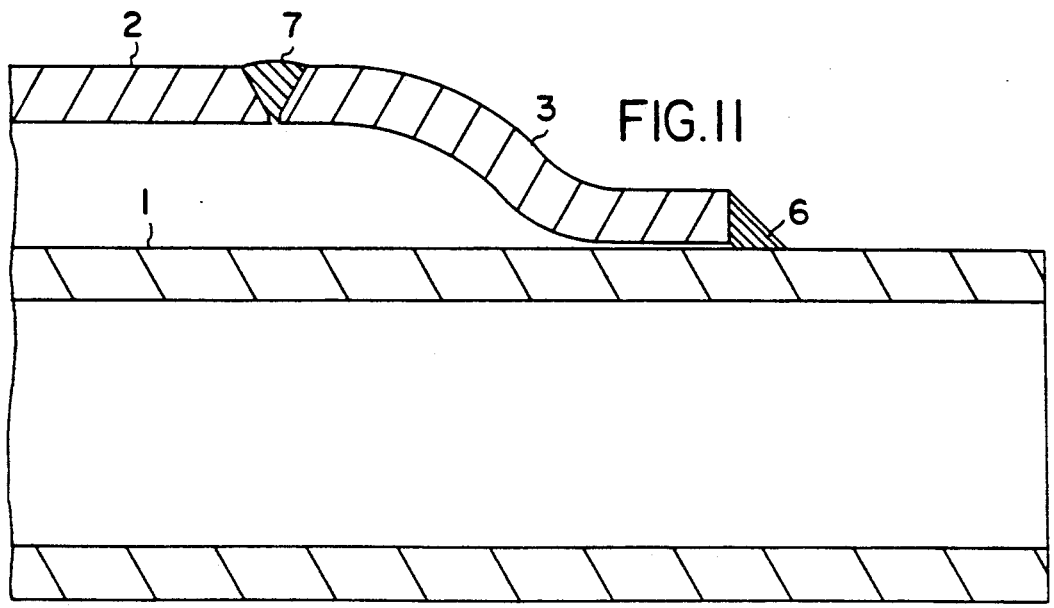
FIG. 11 is a side cross-sectional view similar to FIG. 9 of another type of ½ tapered end joint element.
Figure 12:
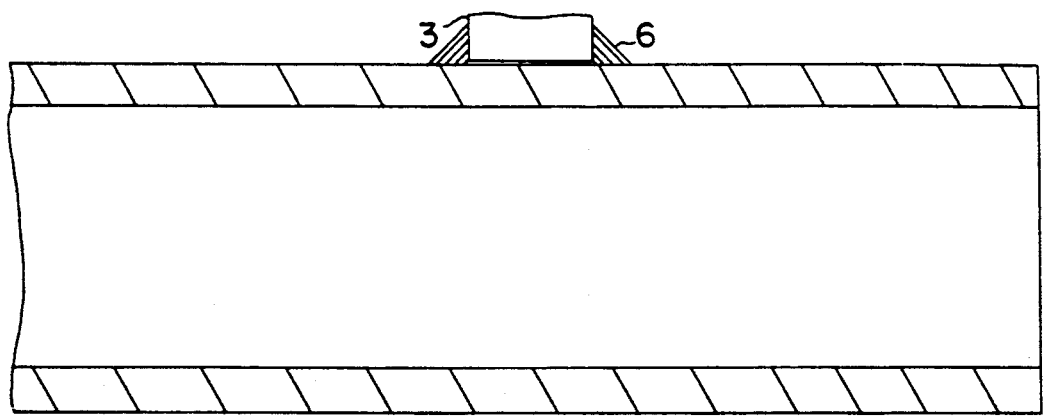
FIG. 12 is a side cross-sectional view similar to FIG. 9 of yet another type of end point element.
Figure 13:
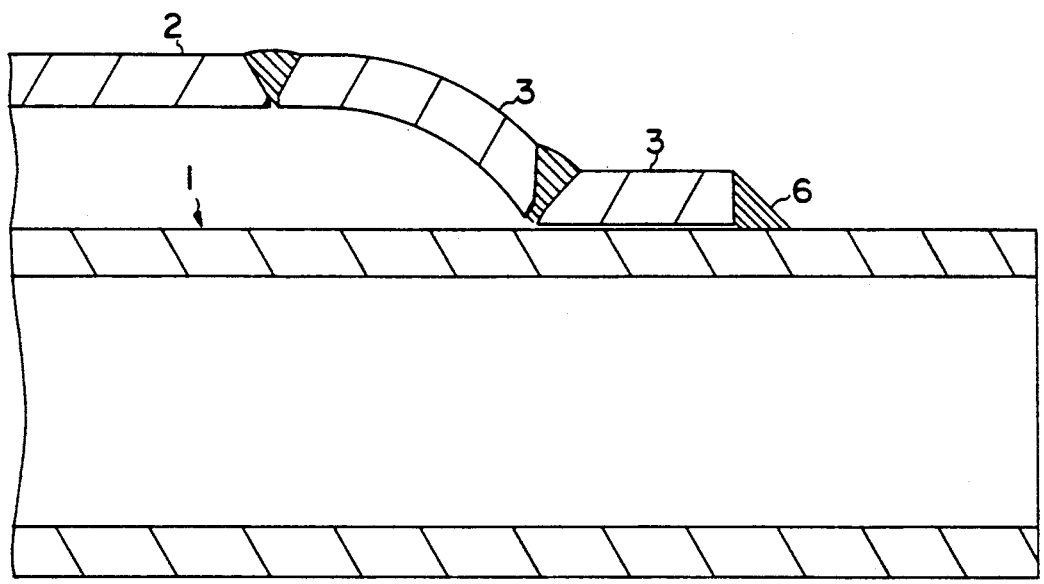
FIG. 13 is a side cross-sectional view similar to FIG. 9 of yet another type of end point element.
Figure 14:
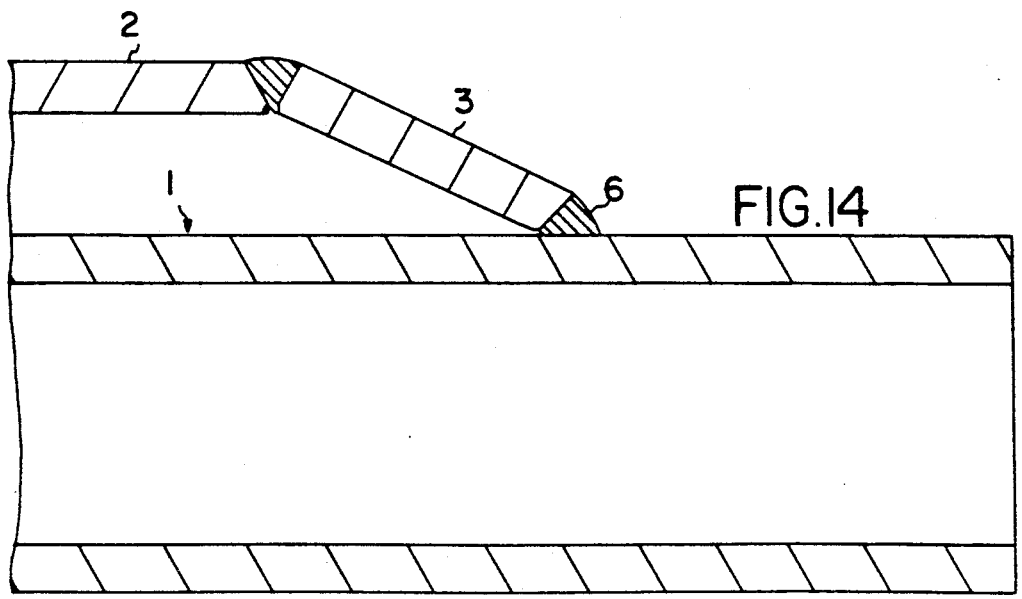
FIG. 14 is a side cross-sectional view similar to FIG. 9 of an additional type of end point element.

In this figure circumferential welds 6, 7, and 9 are shown between the jacket assembly 2 and the piping 1 and in FIG. 9 also shown is a longitudinal bevel 10 for welding the ½ pipes forming the jacket assembly 2.

Figure 5:
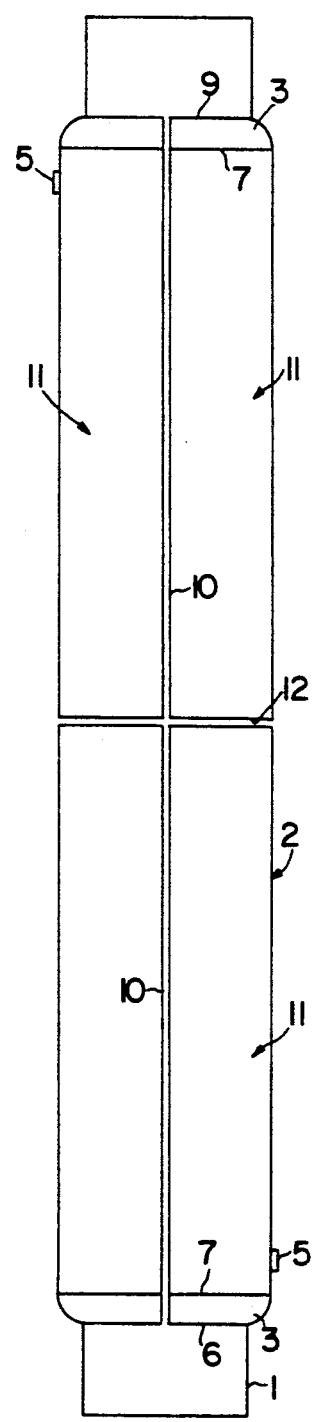
FIG. 5 is a side view of the jacket assembly formed by two sections.

FIG. 5 shows an additional embodiment of the invention wherein the jacket assembly 2 is formed of two sections each formed of ½ pipes with the end joint elements 3 between the jacket assembly 2 and the piping 1, the injection fittings or couplings 5, a weld 7 between the jacket assembly main body and each joint element 3, the circumferential weld 9, the longitudinal bevel 10 and additionally with a jacket section 11 which has the joint element 3 welded to an extremity. Also shown is a circumferential weld 12 for welding the sections 11 forming the jacket assembly 2.

Figure 6:
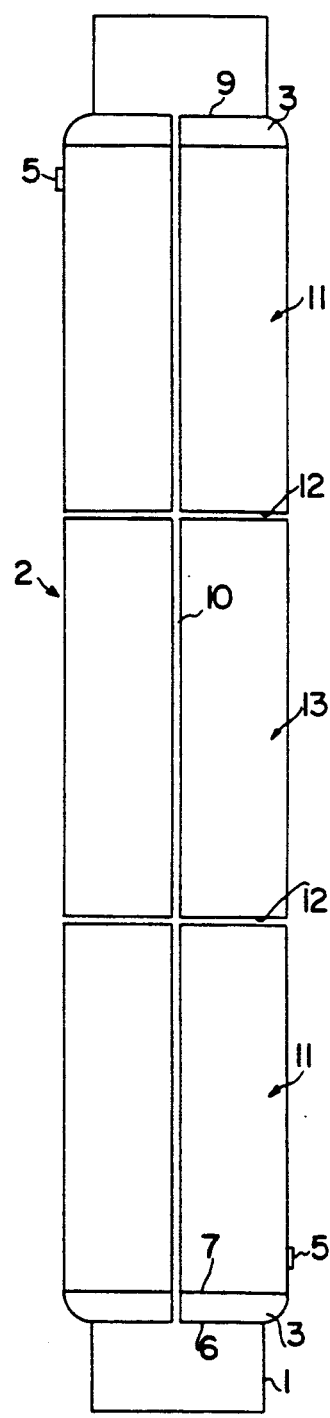
FIG. 6 is a side view of the jacket assembly formed by three sections.

FIG. 6 shows another embodiment wherein the jacket assembly is formed by three sections 11, 11, 13 each formed of ½ pipes having the same parts previously mentioned but including a middle jacket section 13.

Figure 7:
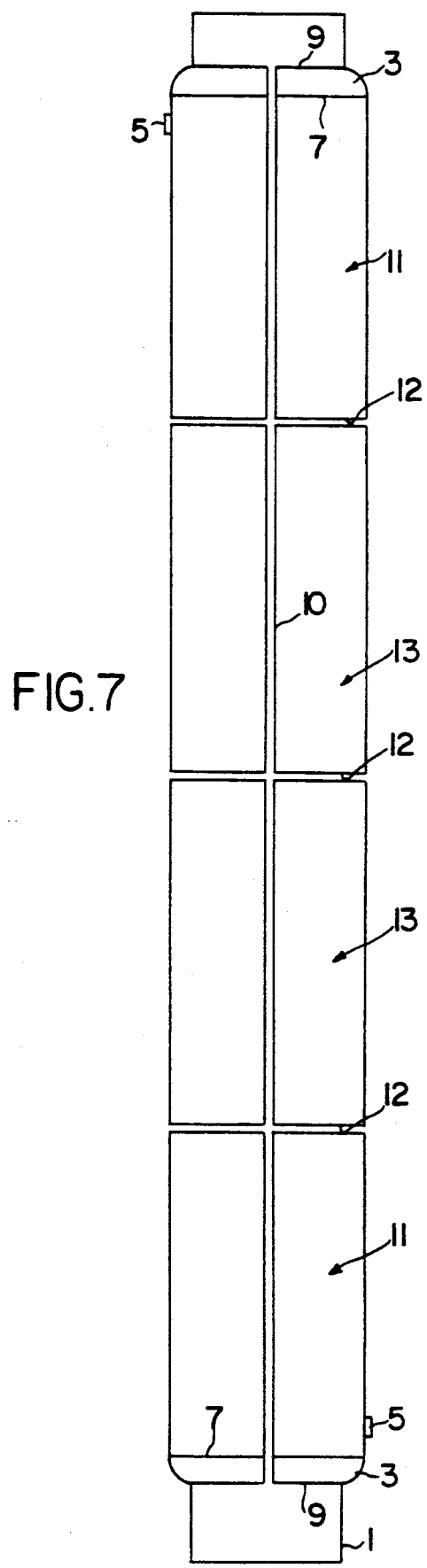
FIG. 7 is a side view of the jacket assembly formed by four sections.

FIG. 7 shows yet another embodiment of the jacket assembly formed in this case by four sections which parts are identical to those of the embodiments of two and three sections.

Figure 8:
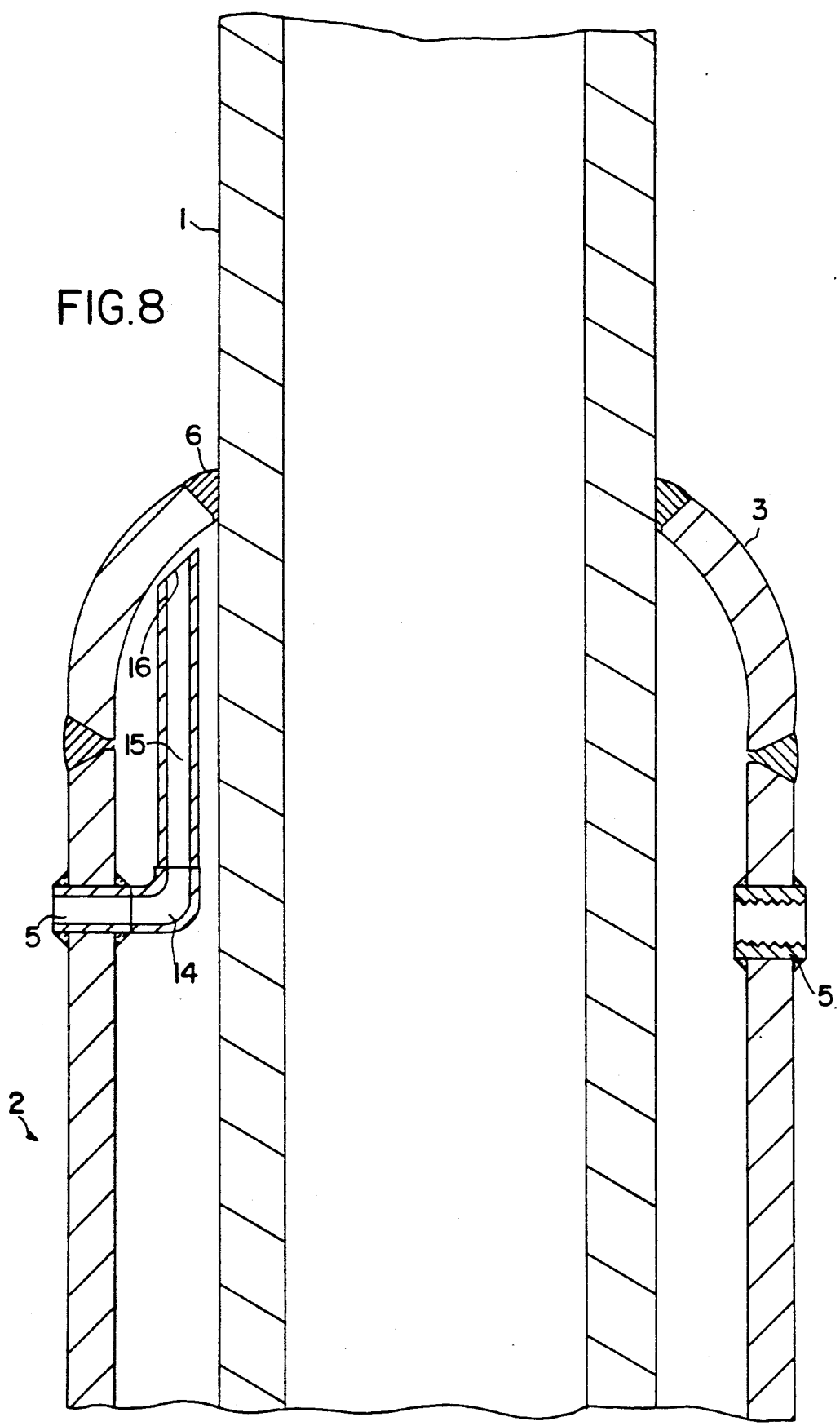
FIG. 8 is a side cross-sectional view of one type of tapered end joint element between the jacket assembly and the piping and a side cross-sectional view of the injection fittings for resin injection.

FIG. 8 shows the injection fitting 5 and a coupling 5 including an elbow joint 14 and a pipe 15. It is noted that the vertical position requires a siphon comprised of the elbow joint 14 and the pipe 15 having a diagonal cut 16 with the object of locating it as close as possible to the top part of the annular space. Due to the inability of venting through other openings, a siphon is necessary to remove any remaining gas or liquid and thereby guarantee that the annular space between the jacket assembly 2 and the pipe 1 be completely filled with the resin. The geometry of the cut may vary in relation to the alternative geometries of the joint element-jacket assembly with joint element 3 to be adapted to this form.

Having described the invention in detail the jacket assembly installation procedure will be described referring especially to the procedure for applying the system in tidal environments in the ascending piping in marine platform production without this being a limitation since, as indicated, this jacket assembly may have other applications.

In marine installations the assembly for protecting ascending piping is installed in situ and without delaying production by means of the following system which includes the steps of:

A.—Positioning the ship in the work area.

B.—Sending a diver into the water and conducting an inspection of the work area.

C.—Removing any obstacle around the platform or fenders (if required).

D.—Conduct the cleaning of the piping at a level of from −4.5 meters to +4.5 meters, or at the level that the state of the system requires since this is variable.

E.—Install the screw pump, baskets, jigs and maneuver in general on the platform.

F.—Find the location of the mid-level or mean (zero) of the waves and tides.

G.—Markings starting at the mean (zero) of the levels of −2.0 meters +4.0 meters (top and bottom weld rings), to the levels required by the state of the system since this is variable.

H.—Calibrate the piping in the area of the top and bottom circumferential welds. At least at 12 o'clock, 3 o'clock, 6 o'clock and 9 o'clock, and in a band 4 inches wide.

I.—Lift from the ship and maneuver onto the platform the first set of ½ pipes which form the jacket sleeve or assembly and position the ½ pipes at the area of the piping exposed to the atmosphere to effect assembly.

J.—Verify the adjustment in assembly of the ½ pipes and mark off, according to standard procedure.

K.—Effect the longitudinal welds, according to standard procedure.

L.—Effect the inspection of the weld seams with ultrasound.

M.—Effect the application of the exterior covering system, according to standard procedure.

N.—Slide downward the first jacket section assembled such that it be partially submerged, to provide space in the assembly for the second jacket section in the area exposed to the atmosphere.

If the jacket assembly comprises several sections this procedure is repeated as many times as necessary with the object of allowing assembly in the area of the piping exposed to the atmosphere.

0.—Lift from the ship and maneuver onto the platform the second set of ½ pipes and position.

P.—Verify the adjustment in assembly of the ½ pipes and mark off, according to standard procedure.

Q.—Effect longitudinal welds, according to standard procedure.

R.—Inspect weld seams by ultrasound.

S.—Assemble and verify adjustment in assembly between the jacket sections and mark off, according to standard procedure.

T.—Effect a circumferential weld joint about the jacket sections therewithin, according to standard procedure.

U.—Inspect the weld seam by ultrasound.

V.—Application of the exterior covering system, according to standard procedure.

The sleeve or jacket assay assembly may be formed by two or more sections, and depending on the number this procedure is repeated until completing the assembly of all the sections therewithin.

X.—Install the sleeve or jacket assembly in the final position (−2.0 meters and +4.0 meters). (The dimension or final position of the sleeve may vary).

Y.—Adjust the piping operating pressure to a predetermined pressure to effect the circumferential weld joints of the sleeve with the piping.

Z.—Verify adjustments of the top and bottom assembly between the sleeve and the piping, and mark off the top assembly according to procedure so that the extremity is within the top calibrated band.

A'.—Effect top circumferential weld according to standard procedure.

B'.—Inspect the weld seam by ultrasound.

C'.—Install pressure welding equipment in a submerged area to effect the lower circumferential weld.

The lower weld joint between the jacket assembly and the piping may be effected either in the atmosphere with the use or appropriate equipment or using underwater welding equipment.

D'.—Effect lower circumferential weld, according to standard procedure within the lower calibrated band.

E'.—Inspect the weld seam by ultrasound.

F'.—Effect pressure test with nitrogen in the annular space between the piping and the sleeve or jacket assembly to a predetermined pressure depending on the maximum piping operating pressure.

G'.—Remove the pressure welding equipment or the other type or equipment utilized to effect the welds.

H'.—Prepare and inject the resin or material disposed in the annular space between the jacket assembly and the piping, according to standard procedure.

I'.—Reinstall the clamps or fenders.

J'.—Inspect and clean the ocean bed.

K'.—Maneuver and remove equipment on the platform.

By way of example, an embodiment is now described of an application of the invention on ascending piping in marine platform production, particularly in tidal areas which suffer from a high degree of corrosion due to the abrasion from the action of the tides, the content chlorides and the high degree of oxygenation of the marine water in this area, as well as the constant spraying of salt on the unsubmerged areas of the piping.

With these causes the degree of corrosion advancement, when the piping operates at temperatures of about 120 degrees Fahrenheit or higher, is increased radically generating a phenomena termed accelerated corrosion.

Accordingly, the invention has one application particularly adequate for affording protection to piping against an aggressive environment, even when the piping operates in the temperature range from 32 to 390 or more degrees Fahrenheit, by means of:

1.0.—Structurally reinforcing the piping in this section such that it works as a single assembly.

2.0.—Insulate the piping with the resin or insulating material, such that the exterior wall of the jacket assembly works at a much lower temperature than that of the piping.

In this case the invention comprises one section of piping with the same specifications as the rest of the duct, onto which a welded metal jacket assembly is installed of variable length and with an annular space of between at least 0.12 inch to 5.00 inches maximum between the piping and the jacket assembly, within which is injected a resin or material with a base of polymers, copolymers or other type, with the following ends: Integrate in one single assembly the piping and the jacket thus achieving structural mechanical properties very superior to those of the piping alone increasing the operating pressure capacity of the piping in this section.

Provide an insulating medium between the piping and the exterior wall of the jacket or sleeve, which is in direct contact with the environment. As a result, operating temperatures and the degree of corrosion in the system are radically reduced, in addition to effecting the adequate exterior covering.

As may be appreciated, the invention in this case is comprised of the same elements with the exception that a section of conduction piping forms a part of the assembly:

Accordingly, the system in this case is comprised of the following elements:

1.0.—Section of conduction piping of any specification or dimension, with or without bevels at the extremities for welding.

2.0.—Section of piping as sleeves of a nominal dimension just larger than that of the conduction piping or manufactured from a plate of any dimension as a section concentrically rolled about the conduction piping as a sleeve.

3.0.—Seal and joint elements between the conduction piping and the sleeve.

4.0.—Resin based polymers, copolymers or any other material which is insulative or has other physical properties with or without mechanical properties to effect a structural function (this resin or material is disposed in the annular space between the conduction piping and the sleeve).

5.0.—System of injection fittings in the sleeve for the injection of resin or insulative material.

6.0.—Exterior covering which can be of any type. Which may be comprised in other possibilities not limited to the following: the use of epoxy resins, synthetic or natural vinyl based elastomers, polyurethane elastomers, anticorrosive paints, etc.

Finally, it is necessary to note that since it was previously mentioned that the geometry of the joint 3 may vary according with the needs of the design that each case may require.

Accordingly, geometries of the joint 3 shown in FIGS. 8, 10, 11, 12, 13 and 14 are provided by way of example and not as limitations, and as indicated may be adapted as adequate geometries to the necessities of each case.

Figure 15:
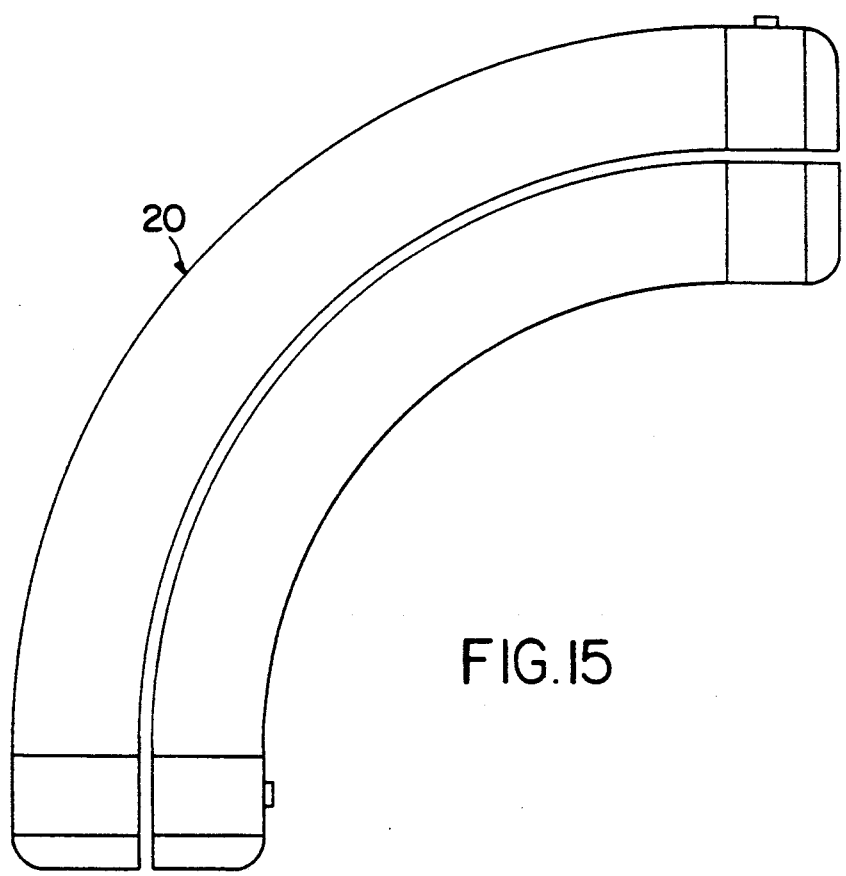
FIG. 15 is a side view of the jacket assembly for elbow joints in piping.
Figure 17:
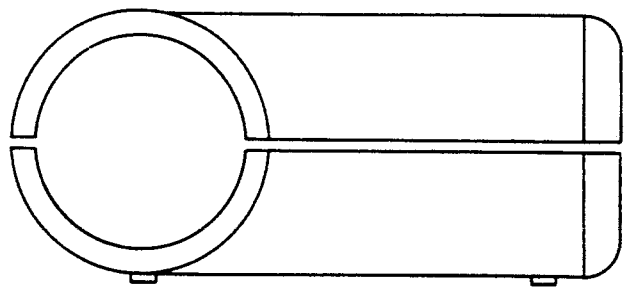
FIG. 17 is a plan view of the jacket assembly for "T" joints in piping.
Figure 16:
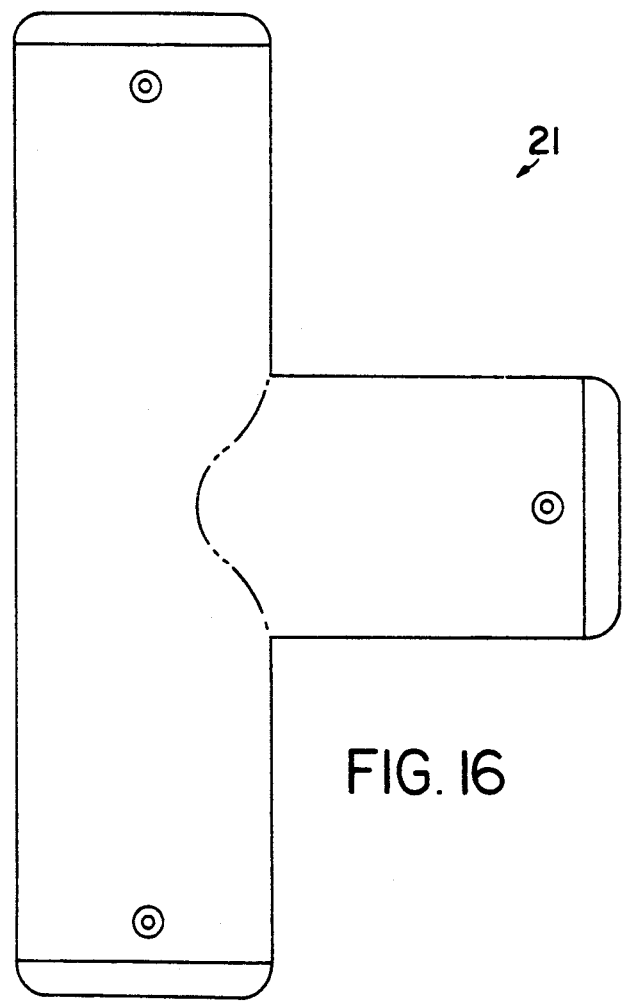
FIG. 16 is a side view of the "T" jacket assembly in piping.

Finally FIGS. 15, 16, and 17 show diverse forms which may be adapted to the jacket assembly to locate the same on curved sections, "T" sections, etc., which forms consist of the same parts as the jacket assembly of FIG. 1 and which are thus not described in detail because they are easily understood by an expert in the art.

While the invention has been described in relation to specific embodiments, it is limited only by the following claims.

We claim:

1. An improved method for the installation of a jacket assembly to reinforce a first portion of piping located substantially at the surface of a body of water and ascending vertically from submerged piping to a second portion of piping exposed to the atmosphere above the surface of the water and adjacent a work platform, said method comprising the steps of:
   (1) calibrating the first portion of piping in axially spaced bands around an outside wall of the piping in areas which will receive circumferential welds to fasten the jacket assembly to the piping;
   (2) positioning a set of ½ pipes, which are to form a first jacket section, around the second portion of the piping exposed to the atmosphere and adjacent the work platform with the ½ pipes abutting at longitudinal edges, the set of ½ pipes when so abutting having an inside diameter greater than an outside diameter of the piping which will provide an annular space between the piping and the jacket assembly and welding the set of ½ pipes together at the longitudinal edges;
   (3) lowering the first jacket section by gravity vertically along the second portion of the piping toward the first portion of the piping;
   (4) where the jacket assembly includes additional jacket sections, positioning the first jacket section thereby providing space for an added jacket section in the second portion of the piping exposed to the atmosphere with an end of the first jacket section abutting an end of the added jacket section, repeating steps 2 and 3 for each added jacket section and circumferentially welding the abutting ends of each jacket section to the added jacket section before lowering the welded jacket sections which form a welded jacket assembly downward to the first portion of the piping;
   (5) welding end joint elements at each extremity of the welded jacket assembly;
   (6) lowering the jacket assembly including the end joint elements by gravity thereby locating the jacket assembly at the first portion of the piping with each extremity thereof at one of the calibrated bands;
   (7) circumferentially welding each extremity of the end joint elements of the jacket assembly to the outside wall of the piping thereby forming an enclosed space; and
   (8) injecting resin into the enclosed space between the jacket assembly and the piping thereby forming an integrated reinforced structure.

2. The method of claim 1 wherein before step 7 the additional step is performed of reducing operating pressure which produces material flow through the first portion of the piping from an elevated operating pressure to a predetermined pressure, and after step 7 the step is performed of returning the operating pressure to the elevated pressure, whereby operating time at the elevated pressure is interrupted for a minimum interval while the circumferential welding step is performed.

3. The method of claim 1 wherein step 2 is carried out from the work platform.

4. The method of claim 1 wherein the piping is utilized for flow of material and steps 1-8 are performed without interrupting flow of material through the first portion of piping.

5. The method of claim 1 wherein an injection port is provided in the jacket assembly and the resin is injected into the annular space through the injection port.

6. The method of claim 3 wherein injecting resin in step 8 is carried out so as to substantially fill the annular space with the resin.

7. The method of claim 4 wherein a siphon is coupled to the jacket assembly at the injection port and the resin is injected into the annular space through the siphon.

8. An improved method for the installation of a jacket assembly to reinforce a first portion of piping located a distance from a second portion of piping, said method comprising the steps of:
   (1) positioning a set of ½ pipes, which are to form a first sleeve section, around the second portion of the piping with the ½ pipes abutting at longitudinal edges, the set of ½ pipes when so abutting having an inside diameter greater than an outside diameter of the piping which will provide an annular space between the piping and the jacket assembly, and welding the set of ½ pipes together at the longitudinal edges;
   (2) sliding the first sleeve section along the second portion of the piping toward the first portion of the piping;
   (3) where the jacket assembly includes additional sleeve sections, positioning the first sleeve section to provide space for an added sleeve section around the second portion of piping with an end of the first sleeve section abutting an end of the added sleeve section, repeating steps 1 and 2 for each added sleeve section and circumferentially welding the abutting ends of each sleeve section to the added sleeve section thereby allowing complete assembly of the jacket assembly while located surrounding the second piping portion spaced from the first portion of piping before sliding the welded sleeve sections which form a welded jacket assembly to a position surrounding the first portion of piping;

(4) welding end joint elements, at each extremity of the welded jacket assembly while the jacket assembly is located surrounding the second piping;

(5) locating the jacket assembly including the end joint elements at the first portion of the piping with each extremity thereof at predetermined positions;

(6) circumferentially welding each extremity of the end joint elements of the jacket assembly to the outside wall of the piping; and (7) injecting resin into the annular space between the sleeve assembly and the piping thereby substantially completely filling the enclosed space and forming an integrated reinforced structure.

9. The method of claim 8 wherein before step 7 the additional step is performed of reducing operating pressure which produces material flow through the first section of the piping from an elevated operating pressure to a predetermined pressure, whereby operating time at the elevated pressure is interrupted for a minimum interval.

10. The method of claim 8 wherein an injection port is provided in the jacket assembly and the resin is injected into the annular space through the injection port.

11. The method of claim 8 wherein injecting resin in step 8 is carried out so as to substantially fill the annular space with the resin.

12. The method of claim 8 wherein a siphon is coupled to the jacket assembly at the injection port and the resin is injected into the annular space through the siphon.

13. The method of claim 8 wherein step 2 is carried out from the work platform.

14. The method of claim 8 wherein the piping is utilized for flow of material and steps 1–7 are performed without interrupting flow of material through the first portion of piping.

15. An improved method for the installation of a jacket assembly to reinforce a first portion of piping extending substantially vertically, and located a distance from a second portion of piping, said method comprising the steps of:

(1) positioning a set of ½ pipes, which are to form a first sleeve section of a jacket assembly, around the second portion of the piping with the ½ pipes abutting at longitudinal edges, the set of ½ pipes when so abutting having an inside diameter greater than an outside diameter of the piping which will provide an annular space between an outside wall of the piping and the jacket assembly, and welding the set of ½ pipes together at the longitudinal edges;

(2) welding end joint elements at each extremity of the jacket assembly;

(3) sliding the jacket assembly including the end joint elements from the second portion of the piping to the first portion of the piping thereby positioning the jacket assembly in a vertical position around the piping with one end joint element being on top of the jacket assembly and one joint element being on bottom of the jacket assembly;

(4) circumferentially welding each extremity of the end joint elements of the sleeve assembly to the outside wall of the piping thereby providing an enclosed space;

(5) injecting resin into the annular space between the sleeve assembly and the piping thereby forming an integrated reinforced structure; and (6) siphoning any gas or liquid remaining in the enclosed space when the resin is being injected through a pipe which opens to outside the jacket assembly and which terminates inside the enclosed space close to the one end joint element at the top of the jacket assembly, whereby the resin is allowed to substantially fill the enclosed space between the jacket assembly and the piping.

* * * * *